United States Patent Office 3,515,982
Patented June 2, 1970

3,515,982
ARRANGEMENT FOR SYNTHETIC CIRCUIT-BREAKER TESTING INCLUDING CURRENT CONTROLLED APPLICATION OF THE SIMULATED SHORT CIRCUIT CURRENT
David Phillip Longworth, Lymm, Michael Alfred Sampson Hick, Stafford, and William Townsley Lugton, Hebburn, England, assignors to Associated Electrical Industries Limited and The English Electric Company Limited, both of London, England, and A. Reyrolle & Company Limited, Hebburn, England, all British companies
Filed Feb. 2, 1968, Ser. No. 702,736
Int. Cl. G01r 31/02
U.S. Cl. 324—28     11 Claims

ABSTRACT OF THE DISCLOSURE

Apparatus for make-break synthetic testing of a high power A.C. circuit breaker, comprising a voltage source for applying across the breaker the steady A.C. voltage prior to its closing and the steady A.C. recovery voltage after its opening, a separate current source for supplying the rated short-circuit current through the breaker immediately on closing thereof, and an oscillatory circuit including pre-chargeable capacitance for applying across the breaker the transient recovery voltage resulting from its opening.

BACKGROUND OF THE INVENTION

This invention concerns arrangements for simulating the voltage and current conditions encountered in the operation of high power electrical apparatus, especially A.C. switch gear, so that such apparatus may be tested without having to be put into service to achieve the proper test conditions.

SUMMARY OF THE INVENTION

It is an object of the invention to provide an apparatus for simulating the sequence of steady A.C. voltage followed by rated short-circuit current, transient recovery voltage and steady A.C. recovery voltage, in that order, which would be encountered by a high power circuit breaker in making-breaking operation in a power system.

According to the invention, such apparatus comprises (a) circuit means, including a voltage source, for applying across the circuit breaker while it is in open state a voltage equivalent initially to the first-mentioned steady A.C. voltage and equivalent at the end of a simulated making-breaking operation to the steady A.C. recovery voltage, (b) circuit means, including a current source, for causing to flow through the circuit breaker immediately on changing of the circuit breaker to closed state a current equivalent to the rated short-circuit current at a low voltage sufficient to avoid distortion of this current relatively to that encountered in operation during breaking thereof, and (c) circuit means, including an oscillatory circuit having prechargeable capacitance, for applying across the circuit breaker at the beginning of the breaking portion of the simulated making-breaking operation a voltage equivalent to the transient recovery voltage.

BRIEF DESCRIPTION OF THE DRAWINGS

One form of apparatus for putting the invention into effect will now be described with reference to the accompanying drawings of which.

DESCRIPTION OF THE PREFERRED EMBODIMENTS

Figure 1:
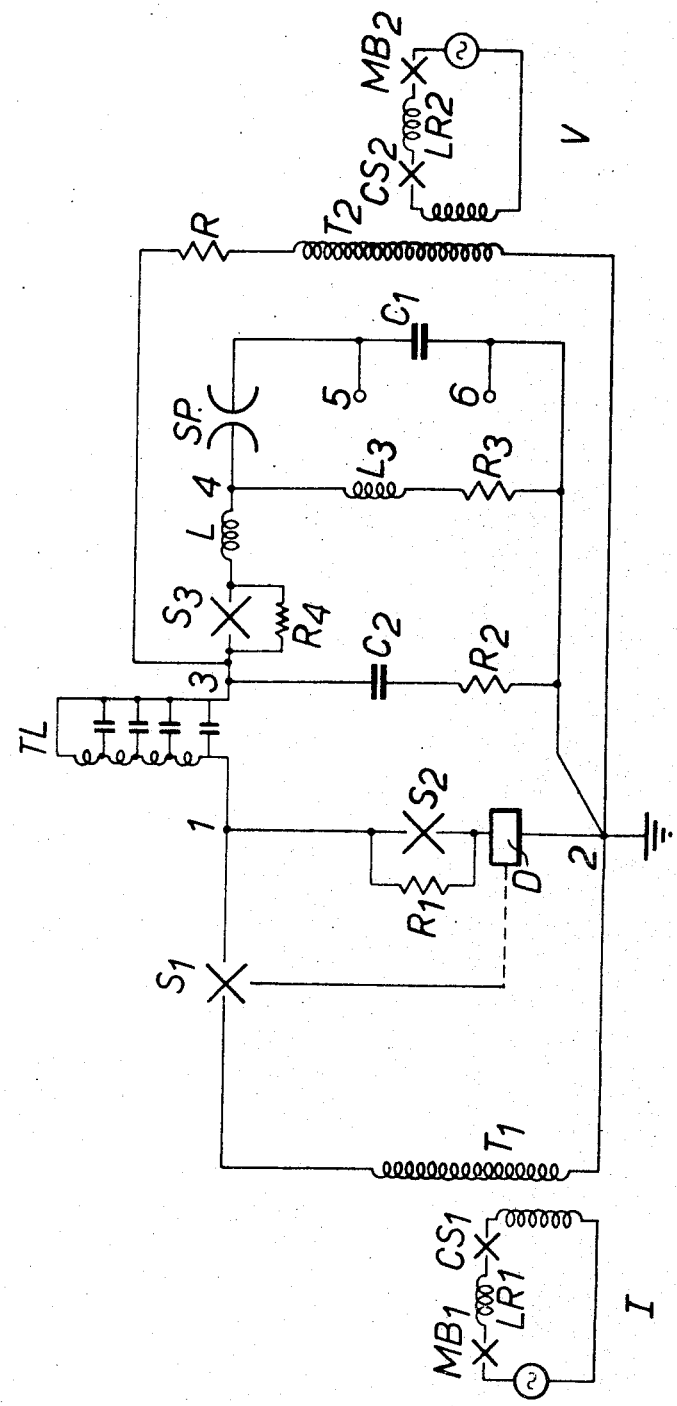
FIG. 1 is a circuit diagram of such apparatus.

The apparatus of which the circuit is shown in FIG. 1 comprises a high amplitude A.C. voltage source V and a high amplitude current source I, both sources supplying current to test terminals 1 and 2, the former by a transformer T2 through an inductance/capacitance arrangement TL between terminals 1 and 3, representing a length of transmission line between the system power source and the circuit breaker in power system operation thereof, and the latter by a transformer T1 through an auxiliary circuit breaker S1 which is controlled by a control device D, which may be either a trigger plasma jet device or a laser beam source device, to be switched very rapidly into conducting state. A series oscillatory circuit comprised by an inductor L and a high voltage rated capacitor C1, and including a triggerable spark gap SP serving as an initiating device, is connected between terminals 3 and 2 by a switch S3 and associated shunt resistor R4, the capacitor C1 being connected between two terminals 5 and 6 by means of which it can be pre-charged to the necessary high D.C. voltage. A damping circuit consisting of an inductor L3 and/or a resistor R3 is connected between terminal 2 and a terminal 4 at the junction of inductor L and spark gap SP. A rate control capacitor C2 in series with an amplitude control resistor R2, which also prevents spurious oscillations appearing on the injected current, is connected between terminals 2 and 3. Each of the sources V and I comprises a transformer (T2, T1) having a primary winding fed from a generator supply through a switch (CS2, CS1), a current limiting reactor (LR2, LR1) and a master circuit-breaker (MB2, MB1) for disconnecting the supply. The transformer T2 circuit includes a series resistor R on either the primary or secondary side for correct phase matching. Thus the transformer T2 serves to add a desired resistor or in-phase current component to the major "short-circuit" current portion from the transformer T1.

Figure 2:
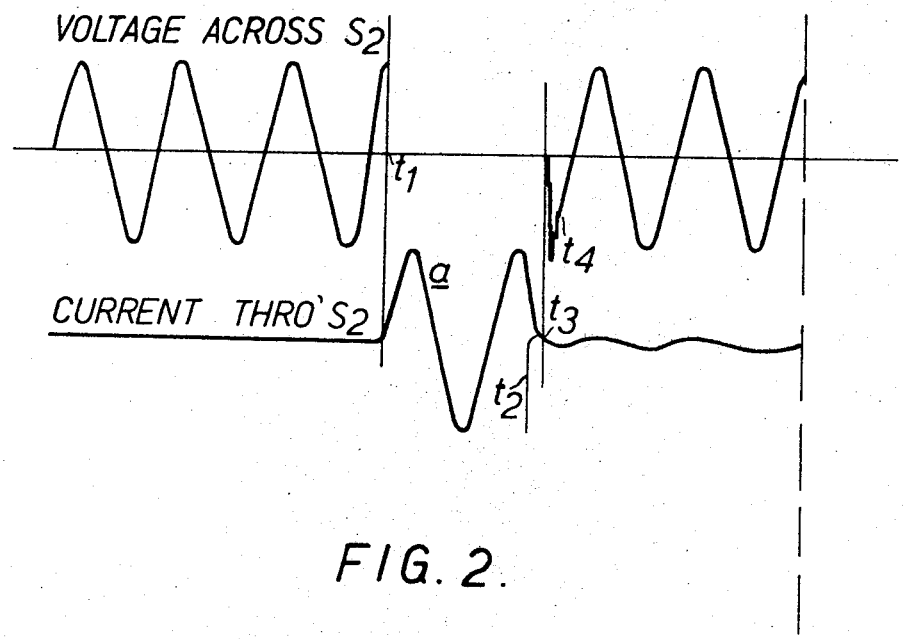
FIGS. 2 and 3 are typical oscillograms obtained in the operation of the apparatus of FIG. 1 in testing a high power A.C. circuit breaker.
Figure 3:
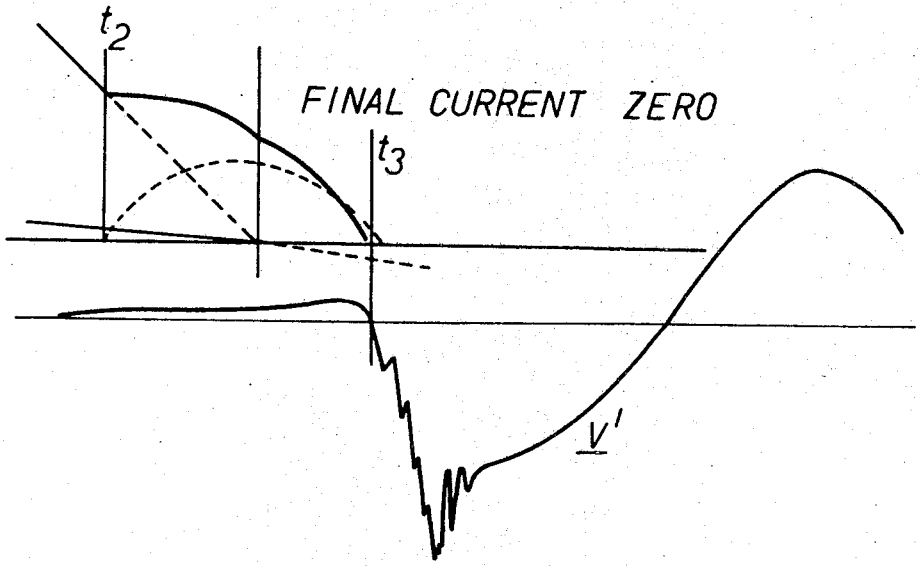

A circuit breaker S2 to be tested, with its associated resistor R1 where fitted, is connected in open state between terminals 1 and 2 for testing purposes, with circuit-breakers S1, S3 and switches CS1, CS2 also in open state, and circuit-breakers MB1 and MB2 in closed state. Upon closing switch CS1 and CS2 a steady high amplitude A.C. voltage from source V is applied to S2, the transformer T2 being capable of supplying, at that voltage, the rated current of the resistor R1. Switch S2 is then closed and immediately current flows through it. This is indicated as taking place at time $t_1$ in FIG. 2. At time $t_1$ the control device D triggers auxiliary circuit breaker S1 thereby connecting the circuit breaker under test to the high amplitude current source I. The circuit breaker S3 is then closed. After a short period $a$ (FIG. 2) of high amplitude current which is a summation of current from transformers T1, T2 the circuit-breakers S1 and S2 are opened but, prior to their opening, as the final current zero is approached, at time $t_2$, the spark gap SP is triggered to connect the pre-charged capacitor C1 into the series oscillatory circuit while breakers S1 and S2 are still closed. At time $t_3$, at the final current zero, the voltage starts rising again. The current and voltage waveforms during the transient recovery period are shown in FIG. 3. The current source I is aranged to supply the rated short-circuit current at a low voltage but not so low as to allow distortion of the current waveform, as compared with that which would occur in power system operation, during the opening of the breakers S1 and S2. At time $t_4$ the "steady" recovery voltage $V^1$ commences as switch S3 is opened to isolate the oscillatory circuit and after a period of such recovery voltage the supply to the sources I and V is interrupted by operation of the master breakers MB1 and MB2.

Instead of opening switch S3 to isolate the oscillatory circuit this switch may be left closed and the damping circuit L3, L3 relied upon the protect capacitor C1 from resonating with T2. If the switch S3 is utilised in the circuit and the test switch S2 restrikes or fails to interrupt at time $t_3$, the resistor R4 across S3 protects the capacitor C1 from possible over voltages.

We claim:

1. An electrical circuit breaker testing arrangement characterized in that a circuit breaker to be tested is connected to a first circuit for supplying, at a first voltage, a major portion of a large current which simulates a short-circuit current to be interrupted when the circuit breaker is on duty, to a second circuit for supplying at a second, higher voltage, a smaller portion of the said large current, which portion is substantially in phase with the said large current, and to a third circuit for supplying a third, still higher voltage which simulates a transient recovery voltage, said arrangement being further characterized by the provision of switching means for completing, when operated, a connection between said first circuit and the circuit breaker to be tested and control means for operating said switching means to close responsive to current caused by the actual connection of the circuit breaker to the said second circuit.

2. An arrangement as claimed in claim 1 characterized in that a main current source is coupled by a transformer means to the said three circuits.

3. An arrangement as claimed in claim 2 wherein the switching means is controlled by a trigger plasma jet device.

4. An arrangement as claimed in claim 2 wherein the switching means is controlled by a laser beam source device.

5. An arrangement as claimed in claim 2 wherein the third circuit includes a capacitor which is series connected to an inductance through a spark gap.

6. An arrangement as claimed in claim 5 wherein the spark gap includes a trigger means.

7. An arrangement as claimed in claim 2 further including a switch for separating the third circuit from the second circuit.

8. An arrangement as claimed in claim 7 further comprising a resistor connected across said switch.

9. An arrangement as claimed in claim 5 further including a damping circuit connected across the capacitor and spark gap.

10. An arrangement as claimed in claim 1 characterized in that the said lower voltage is such as to prevent undesired distortion of the current waveform that occurs in the actual duty circuit, during the circuit-breaker opening.

11. An arrangement as claimed in claim 6 characterized in that the spark gap triggering occurs after the capacitor is charged up, but before the final current zero in the first circuit, and the opening of the circuit-breaker under test.

References Cited

UNITED STATES PATENTS

| 2,898,548 | 8/1959 | Slamecka | 324—28 |
| 3,038,116 | 6/1962 | Einsele | 324—28 |
| 3,373,350 | 3/1968 | Reece | 324—28 |

FOREIGN PATENTS

| 958,911 | 5/1964 | Great Britain. |
| 958,912 | 5/1964 | Great Britain. |

RUDOLPH V. ROLINEC, Primary Examiner

E. L. STOLARUN, Assistant Examiner